(12) United States Patent
Wang et al.

(10) Patent No.: US 10,961,138 B2
(45) Date of Patent: Mar. 30, 2021

(54) WASTEWATER SYNERGISTIC TREATMENT ACCELERATION DEVICE

(71) Applicant: RESEARCH CENTER FOR ECO-ENVIRONMENTAL SCIENCES, CHINESE ACADEMAY OF SCIENCES, Beijing (CN)

(72) Inventors: Aijie Wang, Beijing (CN); Haoyi Cheng, Beijing (CN); Hongcheng Wang, Beijing (CN); Dan Cui, Beijing (CN); Weiwei Cai, Beijing (CN); Jinglong Han, Beijing (CN); Shusen Wang, Beijing (CN)

(73) Assignee: RESEARCH CENTER FOR ECO-ENVIRONMENTAL SCIENCES, CHINESE ACADEMAY OF SCIENCES, Beijing (CN)

( * ) Notice: Subject to any disclaimer, the term of this patent is extended or adjusted under 35 U.S.C. 154(b) by 0 days.

(21) Appl. No.: 16/611,467

(22) PCT Filed: May 9, 2018

(86) PCT No.: PCT/CN2018/086127
§ 371 (c)(1),
(2) Date: Nov. 6, 2019

(87) PCT Pub. No.: WO2018/205946
PCT Pub. Date: Nov. 15, 2018

(65) Prior Publication Data
US 2020/0140300 A1 May 7, 2020

(30) Foreign Application Priority Data
May 11, 2017 (CN) .......................... 201710332928.3

(51) Int. Cl.
*C02F 3/00* (2006.01)
*C02F 3/28* (2006.01)
*C02F 101/30* (2006.01)

(52) U.S. Cl.
CPC .............. *C02F 3/005* (2013.01); *C02F 3/006* (2013.01); *C02F 3/2846* (2013.01);
(Continued)

(58) Field of Classification Search
None
See application file for complete search history.

(56) References Cited

U.S. PATENT DOCUMENTS

| | | | | |
|---|---|---|---|---|
| 2002/0153245 A1* | 10/2002 | Henuset | .............. | C02F 1/46109 204/248 |
| 2006/0144709 A1* | 7/2006 | Belt | ........................ | C25B 11/02 204/554 |
| 2008/0035548 A1* | 2/2008 | Fan | .......................... | B01J 47/08 210/243 |

* cited by examiner

*Primary Examiner* — Richard C Gurtowski
(74) *Attorney, Agent, or Firm* — CBM Patent Consulting, LLC

(57) ABSTRACT

A sewage/wastewater biological treatment system—sewage (wastewater) synergistic treatment acceleration device, which includes four components of a reaction assembly, a signal transmission assembly, a control assembly, and a housing carrying assembly. The reaction assembly can realize the colonization/proliferation of functional microorganisms, participate in the interface electron transfer between the electrode-microbe-sewage as an electron donor/receptor and electrode interface of the (bio)electrochemical reaction, and optimize the flow characteristics in the sewage/wastewater treatment system. The signal transmission assembly enables the conduction of applied voltage and real-time signal acquisition and transmission of key parameters. The monitoring assembly implements intelligent controllability of the present invention. The housing carrying assembly
(Continued)

enables integrated assembly of single device and multi-device serial/parallel operation assembly.

12 Claims, 18 Drawing Sheets

(52) U.S. Cl.
CPC ........ *C02F 3/2866* (2013.01); *C02F 2101/30* (2013.01); *C02F 2201/004* (2013.01); *C02F 2201/4611* (2013.01); *C02F 2201/4617* (2013.01); *C02F 2201/46135* (2013.01); *C02F 2203/006* (2013.01)

WASTEWATER SYNERGISTIC TREATMENT ACCELERATION DEVICE

TECHNICAL FIELD

The invention belongs to the technical field of pollution treatment, and relates to a synergistic treatment device for strengthening decomposition of medium and low concentration industrial wastewater, industrial park mixed wastewater, micro-polluted water body and refractory organics in contaminated sediment, and particularly relates to a sewage/wastewater synergistic treatment acceleration device.

BACKGROUND ART

Industrial wastewater and industrial park mixed wastewater containing refractory organic pollutants in industries such as petrochemicals, plastics, synthetic fibers, coking, printing and dyeing, pharmaceuticals and industrial parks have increasingly become a major problem in the field of water treatment. Generally, such wastewater has refractory organic pollutants (such as polycyclic aromatic hydrocarbons, halogenated hydrocarbons, heterocyclic compounds, organic chlorides, organophosphorus pesticides, surfactants, organic dyes, etc.), and has the characteristics of high content, low biodegradability, complex water quality, high toxicity, large fluctuation of water quality and water quantity, large pH change, and high salt content. In addition, even if the wastewater containing refractory pollutants is treated by the wastewater treatment plant to reach the standard, there will still be a small part of the refractory pollutants discharged into the natural water body along with the effluent. These natural water bodies receive effluent of the sewage treatment plant for a long time and in large quantities, and also receive natural shower micro-polluted water from roads, farmland, greening, and so on. Therefore, in the long run, a large amount of refractory organic pollutants will remain in natural water bodies and sediments.

At present, the treatment methods for such medium and low concentration industrial wastewater and industrial park mixed wastewater containing refractory organics are anaerobic biological treatment (conditioning) combined with aerobic biological treatment as the main process, and then assisted by advanced oxidation method (Fenton oxidation method, ozone oxidation method, catalytic wet chamber oxidation method, etc.) and physicochemical treatment method (activated carbon adsorption, ion exchange method, membrane separation, etc.) or the like as a pretreatment or a strengthening process.

In the existing anaerobic biological treatment equipment, the anaerobic or facultative microbial metabolic process produces more complex enzymes to decompose macromolecules and difficult biodegradable pollutants in the wastewater into small molecules and organics that are easily biodegradable; or the microorganisms in the equipment directly use complex organics as a carbon source for self-growth, thereby achieving the function of removing organics in the wastewater. However, the current anaerobic biological treatment processes have the following disadvantages: slow processing speed, low efficiency, long residence time, large floor space, high capital cost; poor performance in detoxification, dehalogenation and decolorization etc. of macromolecules and difficult biodegradable pollutants in wastewater; limited improvement in biodegradability of wastewater and limited ability to reduce subsequent aerobic system load; limited treatment capacity of low-concentration refractory organic pollutants in micro-polluted wastewater and medium and low concentration industrial wastewater, and difficult to achieve increasingly strict emission standards for the overall process effluent; difficult operational adjustment, and easily prone to collapse of the overall system.

For the problems existing in the above existing anaerobic systems, a large number of small-scale bioelectrochemical systems have demonstrated the great advantages of bioelectrochemical systems as an emerging water treatment technology in the treatment of refractory organic pollutants and resource energy recovery. In bioelectrochemical system, microorganisms are used as catalysts to convert chemical energy into electrical energy; anode microorganisms make efficient use of small molecular organics in wastewater; cathode microorganisms are domesticated, and convert and degrade organic pollutants by using electrodes as electron donors. The overall process has a small demand for carbon source electron donors. This technology accelerates the reduction and degradation of some refractory organic pollutants (nitroaromatics, azos, perchlorinated hydrocarbons, aromatic hydrocarbons, etc.) at the cathode electrode through smaller energy input and control of potential conditions, thereby achieving targeted and efficient removal of these refractory pollutants. In addition, bioelectrochemical system can be organically coupled with traditional anaerobic processes, greatly increasing the space utilization of anaerobic devices, increasing biomass, achieving efficient and directional transformation of the refractory pollutants remaining in the anaerobic biological reaction, overcoming the disadvantages of less carbon source and low COD/TKN in industrial wastewater, and strengthening the conversion and removal of refractory organic pollutants in wastewater.

However, the above bioelectrochemical system is still difficult to realize engineering application at present, and mainly exists the following technical bottlenecks: (1) there is no electrode that can be applied for engineering currently. In general, the existing electrode forms cannot balance functionality and economy. Electrodes with excellent performance are costly and are less likely to be used on a large scale, while the electrode material that is easy to achieve large-scale amplification has the problem of how to optimize performance under economically viable conditions during amplification applications. Therefore, finding an electrode material that combines functionality and economy and optimizing it by engineering techniques to have better performance will be the main direction for realizing the scale application of bioelectrochemical systems. (2) The bioelectrochemical system has a difficult control mode and a complex system involving multiple disciplines such as microbiology, electrochemistry, and communication control. How to integrate and intelligently design and control the entire system is also a key factor affecting the engineering application and prospects of the technology. (3) A single bioelectrochemical system cannot replace existing biological treatment technology as an independent and effective unit to treat industrial wastewater or industrial park mixed wastewater containing refractory organic pollutants. How to effectively realize the combination of this technology and the existing process system will greatly promote the application and development of bioelectrochemical technology, and will also greatly enrich the form of the existing anaerobic bioprocess and improve its performance.

CONTENTS OF THE INVENTION

(I) Technical Problems to be Solved

The invention is mainly for solving the problems that the existing water treatment process has low treatment efficiency, slow rate, limited tolerance to toxic impact, difficulty in stable operation on the refractory wastewater, and the slow decomposition and conversion rate of refractory organic pollutants in micro-polluted water bodies and sediments in the prior art, and provides a sewage/wastewater synergistic treatment acceleration device.

(II) Technical Solutions

A reaction assembly, includes at least one anode member and at least one cathode member; the anode member and the cathode member form a porous passage, and the anode member and the cathode member are isolated by an insulating member.

Preferably, both said anode member and said cathode member are of a corrugated type;

the anode member and the cathode member are alternately arranged and the adjacent anode member and the cathode member are reversed, and said porous passage is a "honeycomb" passage; and an insulating member is disposed between the anode member and the cathode member.

Preferably, said anode member is of a corrugated type, and said cathode member is of a roll type;

a plurality pieces of anode members are staggered arranged to form "honeycomb" passages, the cathode members are filled in the "honeycomb" passages in the axial direction of the corrugated, and said porous passages is a "biphenyl" passage; and the insulating member covers the cathode member.

Preferably, said anode member is a stainless steel woven mesh, a stainless steel foil diagonal wire mesh or a stainless steel foil punching mesh.

Preferably, said cathode member is two pieces of corrugated type stainless steel woven meshes clamping a stainless steel gas-liquid filter, or two pieces of corrugated type stainless steel foil diagonal wire meshes clamping a stainless steel gas-liquid filter, or two pieces of corrugated type stainless steel foil punching meshes clamping a stainless steel gas-liquid filter.

Preferably, said cathode member is a stainless steel gas-liquid filter crimped into a roll type.

Preferably, said anode member and said cathode member are held together by a combination screw.

Preferably, said anode members are held together by a combination screw.

A sewage/wastewater synergistic treatment acceleration device, includes said reaction assembly, a signal transmission assembly and a monitoring assembly;

said signal transmission assembly is used to conduct an applied voltage to the reaction assembly and collect and transmit data of the reaction assembly in real time;

said monitoring assembly is used for visualization of operational data, intelligent control operation of applied voltage, and safety protection, and fault diagnosis alarm.

Preferably, further includes a housing carrying assembly, and said housing carrying assembly is used for carrying the reaction assembly and the signal transmission assembly.

Preferably, said housing carrying assembly has a corrugated flow guiding channel or a louvered flow guiding channel or a porous flow guiding channel.

Preferably, said signal transmission assembly includes: a current collector, a connector, a reference electrode and a transmission cable;

said current collector includes a cathode current collector and an anode current collector, the cathode current collector is used for the series current collection of the cathode members, and said anode current collector is used for the series current collection of the anode members; and said connector connects the reference electrode, the current collector and the monitoring assembly through a transmission cable.

Preferably, said connector includes a 2-3-4 core three-head connector, a 4-core single-head connector, a 3-core single-head connector and a 2-core single-head connector;

the input end of said 2-core single-head connector is connected to the power supply of the monitoring assembly, and the output end is connected to the 2-core head of the 2-3-4 core three-head connector;

the input end of said 3-core single-head connector is connected to the anode current collector, the cathode current collector and the reference electrode, and the output end is connected to the 3-core head of the 2-3-4 core three-head connector; and the input end of said 4-core single-head connector is connected to the 4-core head of the 2-3-4 core three-head connector, and the output end is connected to the monitoring assembly.

Preferably, said monitoring assembly includes a controllable DC power supply, a data acquisition device and an industrial control system.

A upflow anaerobic reactor, includes one or multiple sets of above sewage/wastewater synergistic treatment acceleration device.

Preferably, said multiple sets of sewage/wastewater synergistic treatment acceleration device units operate in series or in parallel.

(III) Beneficial Effects

According to the above technical description, the sewage/wastewater synergistic treatment acceleration device has the following technical advantages:

(1) The sewage/wastewater synergistic treatment acceleration device directionally regulates/directionally enhances the biodegradation process of refractory pollutants, reduces the biological toxicity of refractory organics in wastewater (sewage), destroys the structural complexity of refractory organics in wastewater (sewage) through the synergistic catalysis of biochemistry and electrochemistry, and greatly accelerates the detoxification, decolorization and dehalogenation of wastewater (sewage).

(2) The sewage/wastewater synergistic treatment acceleration device greatly increases the content of biodegradable organics in wastewater (sewage), greatly improves the biodegradability of wastewater (sewage) through the accelerated degradation of macromolecular organic pollutants in waste (sewage) water and further excavation of non-bioavailable organics, and thus can greatly improve the overall treatment efficiency of wastewater, making the overall system with better effluent quality.

(3) The sewage/wastewater synergistic treatment acceleration device is a modular design, and the overall design is easy to process, install, maintain and overhaul, and the operation is convenient and flexible. No need to specially design the reaction device, it can be operated in single module single system or multi-module multi-system in series (parallel). The overall size and combination are also adjustable, allowing for coupling with different existing processes to form a new process system.

(4) The signal transmission and monitoring system of the sewage/wastewater synergistic treatment acceleration device realizes the automatic intelligent control. The "acceleration device" has strong controllability, and can control and adjust the applied voltage and the anode and cathode potential according to the influent quality, influent quantity and processing requirements, thereby controlling the electrode microbial activity to achieve the target. In addition, features such as visualization of operational data, security protection, and fault diagnostic alarm allow the "acceleration device" to maintain system stability and reliability.

(5) The sewage/wastewater synergistic treatment acceleration device adopts stainless steel mesh. Firstly, it has high mechanical strength, which can perform better mechanical processing and forming. Secondly, it has strong chemical stability, resists acid, alkali and corrosion, and is widely applicable to characteristics of various wastewaters. Thirdly, it has good conductivity, low resistivity, low price, and is easy to obtain.

SPECIFIC EMBODIMENTS FOR CARRYING OUT THE INVENTION

In order to make the objects, technical solutions and advantages of the present invention more clear, the present invention will be further described in detail below in conjunction with specific examples and with reference to the accompanying drawings.

The specific examples are provided herein, but are not intended to limit the scope, the applicability, and the specific structure of the present invention. Instead, the examples are embodiments of the present invention that is implemented by those skilled in the art according to known conditions, and the specific functional parameters and arrangements of the components can be changed. Accordingly, various embodiments may omit, substitute, or add steps or related similar assemblies as appropriate. For example, it is to be understood that the methods may be carried out in a different order than that described, and that the methods may be practiced with different parameters than those described, and various steps may be added, omitted or combined. Moreover, the parameters and methods described in certain embodiments can be combined with other embodiments.

The sewage (wastewater) synergistic treatment "acceleration device" described in the specific embodiment of the present invention is a scale size and a material structure in a standard state.

Figure 1:
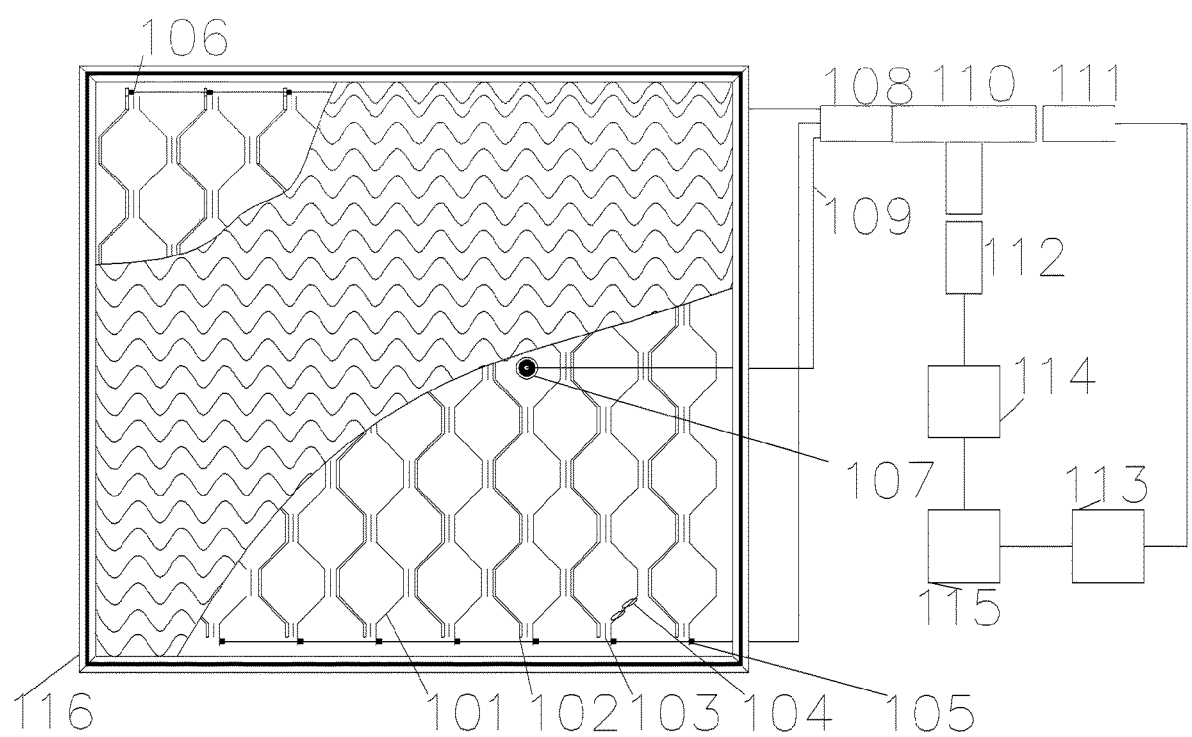
FIG. 1 is a schematic view showing the structure of the sewage (wastewater) synergistic treatment "acceleration device" according to an embodiment of the present invention.

FIG. 1 is a schematic view showing the structure of the sewage (wastewater) synergistic treatment "acceleration device" in a single reaction assembly module state. As shown in FIG. 1, the synergistic treatment "acceleration device" includes four components: a reaction assembly, a signal transmission assembly, a monitoring assembly, and a housing carrying assembly.

The reaction assembly is composed of an anode member 101, a cathode member 102, and an insulating member 103. On the surface of the anode member and the cathode member, the electrode assembly is enriched with electroactive microorganisms 104, and the anode member and the cathode member are alternately arranged to form a porous passage, and the porous passage includes a "honeycomb" passage or a "biphenyl" passage.

The signal transmission assembly includes a current collector, a connector, a reference electrode and a transmission cable, and specifically includes: an anode current collector 105, a cathode current collector 106, a solid reference electrode 107, a 3-core single-head connector 108, a 2-3-4 core three-head connector 110, a 2-core single-head connector 111, a 4-core single-head connector 112, and a transmission cable 109. The signal transmission assembly has IP68 waterproof characteristics.

The monitoring assembly is mainly composed of a data acquisition device 114, a controllable DC power supply 113, and an industrial control system 115. The industrial control system can realize data visualization, system intelligent control, and security alarm.

The housing carrying assembly mainly functions to carry the reaction assembly and the signal transmission assembly. In the present embodiment, the housing carrying assembly 116 with a corrugated flow guiding channel is used.

The reaction assembly has two structural forms: "honeycomb" and "biphenyl".

Figure 2A:
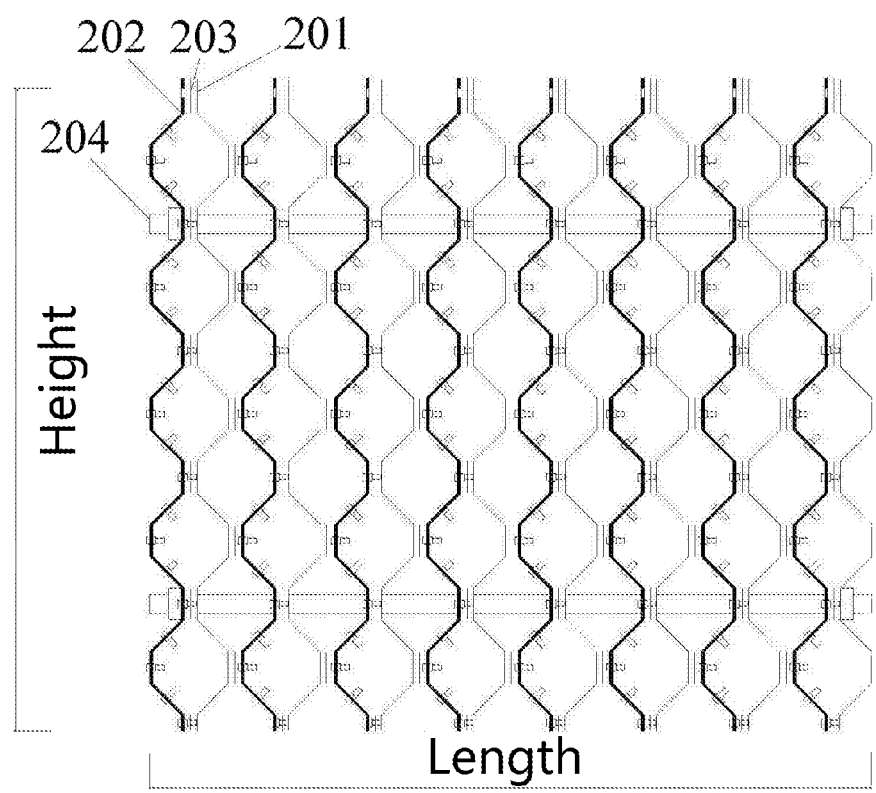
FIG. 2A is a front view showing the structure of a "honeycomb" assembled reaction assembly according to an embodiment of the present invention.
Figure 2B:
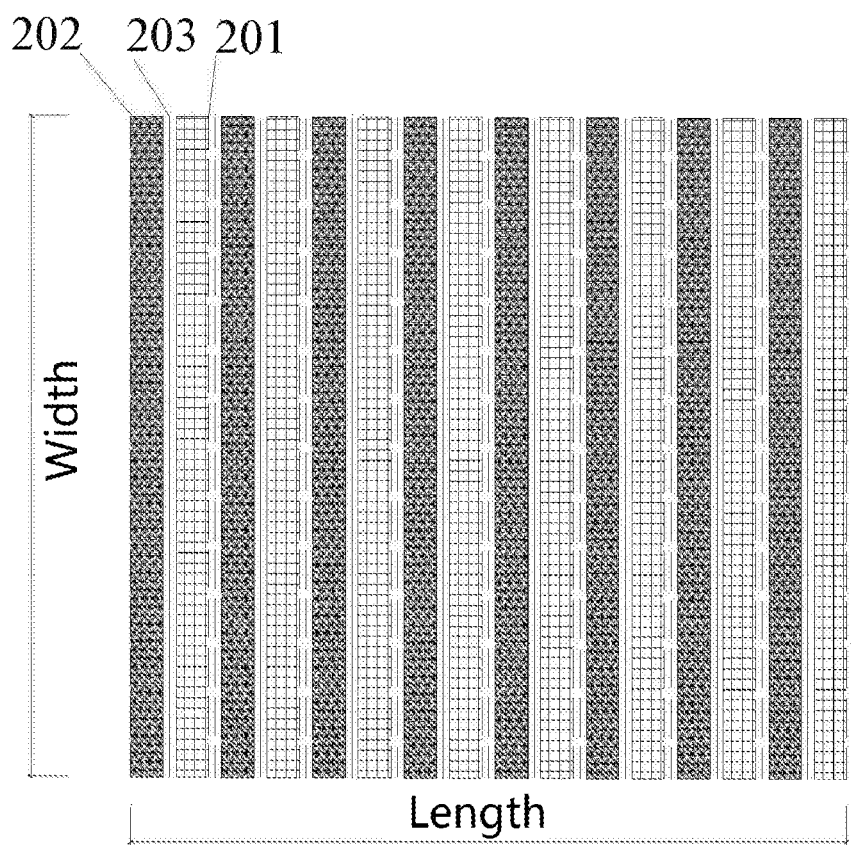
FIG. 2B is a top view showing the structure of a "honeycomb" assembled reaction assembly according to an embodiment of the present invention.

FIG. 2A and FIG. 2B are respectively a schematic front view and a top view showing the structure of a "honeycomb" assembled reaction assembly according to an embodiment of the present invention, and a specific embodiment of a reaction assembly of the sewage/wastewater synergistic treatment acceleration device of the present embodiment is described with reference to FIG. 2. The reaction assembly can realize the colonization/proliferation of functional microorganisms in the treatment system, participate in the interface electron transfer between the electrode-microbe-sewage as an electron donor/receptor and electrode interface of the (bio)electrochemical reaction, and optimize the flow characteristics in the sewage/wastewater treatment system.

The "honeycomb" assembled reaction assembly has a sheet-shaped corrugated type anode member, an insulating member, and a sheet-like corrugated type cathode member, which are alternately assembled. The anode member and the cathode member are one or more pieces and the number is equal. The "honeycomb" passage is formed by the staggered arrangement of the corrugated type, in which any single-piece anode member and any single-piece cathode member are sandwiched between a single-piece insulating member, and on both side of any insulating member are a single-piece anode member and a single-piece cathode member. The anode member is completely isolated from the cathode member by using the insulating member.

Figure 2C:
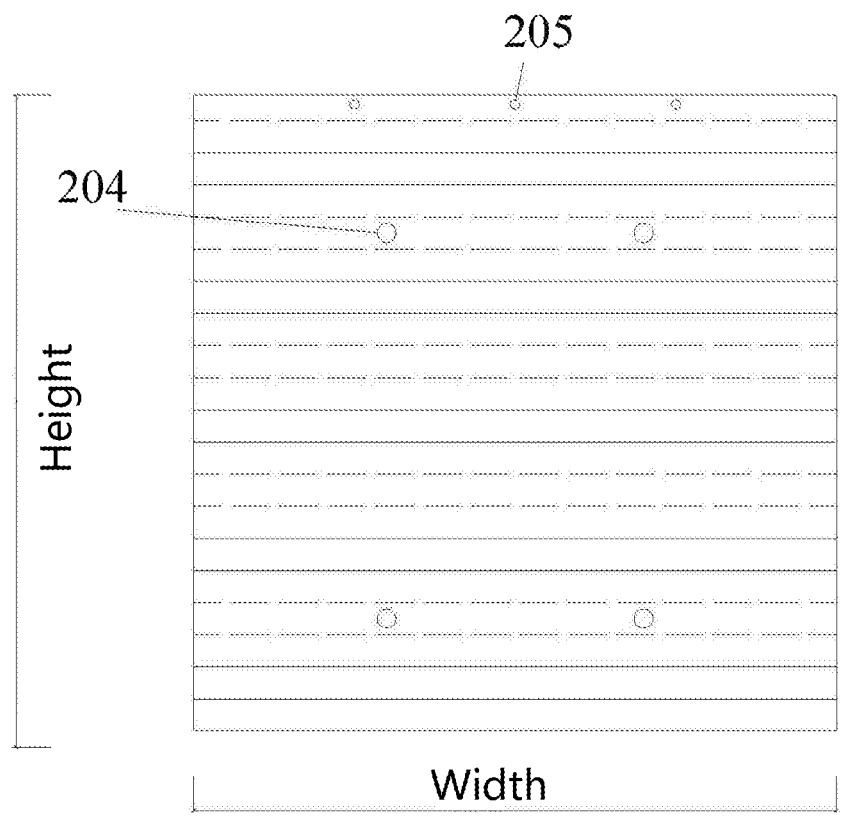
FIG. 2C is a side view of the anode side of a "honeycomb" assembled reaction assembly according to an embodiment of the present invention.

The reaction assembly includes an anode member 201, a cathode member 202, an insulating member 203 and a combination screw 204. FIG. 2C is a schematic side view showing the structure of an anode member of a reaction assembly according to an embodiment of the present invention. As shown in FIG. 2C, one end of the anode member and the cathode member are respectively provided with an anode current collector and a cathode current collector, and both three collecting holes 205 are opened at the position where the cathode member corresponds to the cathode current collector and the position where the anode member corresponds to the anode current collector, wherein the two side collecting holes of the anode member serve as a connection between the anode members of the individual acceleration device, and the two side collecting holes of the cathode member serve as a connection between the cathode members of the individual acceleration device, and the intermediate collecting hole is the channel through which the reaction assembly of the acceleration device are connected to the signal transmission assembly.

The reaction assembly has an overall dimension of 1000 mm (length)×1000 mm (width)×1000 mm (height), which is formed by combining 8 corrugated type anode members, 8 corrugated type cathode members and 15 sets of insulating members through 4 combination screws. The corrugated type anode members and the corrugated type cathode members are arranged in reverse crosswise to form "honeycomb" passages. The adjacent anode member and anode member are separated by an insulating member having a thickness of 5 mm, and the insulating member is a porous rubber pad in this embodiment to ensure insulation and maintain a stable distance between the anode member and the cathode member.

The specific size of the reaction assembly can be freely adjusted according to actual needs, and the adjustment range is based on adjusting the number of corrugated type (cathode) anode members included in a single reaction assembly of an acceleration device and the parameters of the corrugated type (cathode) anode member. The adjustment range is: length, width and height, all of which can be adjusted from 100 mm to 1500 mm. The thickness of the insulating member determines the distance between the cathode member and the anode member of the reaction assembly, and can be freely adjusted according to actual needs in the specific implementation process, and the adjustment size is adjustable within a range of 2 mm to 20 mm.

Figure 2D:
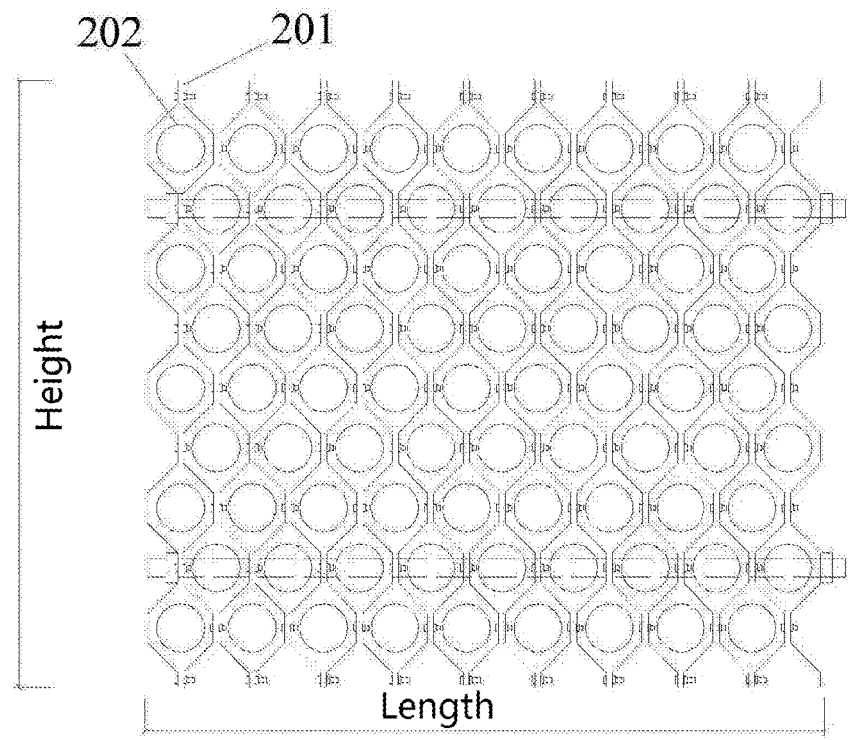
FIG. 2D is a front view of a "biphenyl" assembled reaction assembly according to an embodiment of the present invention.

FIG. 2D is a front view of a "biphenyl" assembled reaction assembly according to an embodiment of the present invention. As shown in FIG. 2D, the cathode member is of a roll type, the anode member is of a corrugated type, and the plurality pieces of anode members are staggered arranged to form "honeycomb" passages, and then the roll type cathode electrodes are filled in the "honeycomb" passages in the axial direction of the corrugated to form a "biphenyl" assembly, while the anode members and the cathode members are completely isolated by using the insulating members. In this embodiment, the insulating members are coated on the outside of the cathode members, and the number of cathode members depends on the number of "honeycomb" passages formed by the anode members. The anode members are held together by combination screws, and the cathode members coated with the insulating members are placed directly in the "honeycomb" passages formed by the anode members.

As the main body and function realization area of the sewage/wastewater synergistic treatment acceleration device, the reaction assembly mainly has three functions: firstly, it acts as a microbial carrier in the treatment system to realize the colonization and proliferation of functional microorganisms in the treatment system; secondly, it participates in the interface electron transfer between the electrode-microbe-sewage as an electron donor/receptor and electrode interface of the (bio)electrochemical reaction; thirdly, it can be used as a carrier to optimize the flow characteristics in the sewage/wastewater treatment system when applied to sewage/wastewater treatment systems.

The anode member can be in three structural forms: corrugated type stainless steel woven mesh, corrugated type stainless steel foil diagonal wire mesh or corrugated type stainless steel foil punching mesh.

Wherein, the stainless steel woven mesh is a plain weave stainless steel woven mesh or a twill stainless steel woven mesh, and the mesh aperture is 1 mm to 50.8 mm, preferably 5.45 mm to 25.4 mm.

The stainless steel foil diagonal wire mesh has a thickness of 0.04 mm to 2 mm, preferably 0.4 mm to 1.2 mm, and a mesh aperture of 0.3×0.6 mm to 30×60 mm, preferably 5×10 mm to 15×30 mm.

The stainless steel foil punching mesh has a thickness of 0.04 mm to 2 mm, preferably 0.4 mm to 1.2 mm, and a mesh aperture of 0.5 mm to 25.4 mm, preferably 1 mm to 15 mm.

The material of the anode member is a chromium-manganese-nickel austenite (200 series) stainless steel mesh or a chromium-nickel austenite (300 series) stainless steel mesh, and more preferably a 304 or 316 stainless steel mesh.

Figure 3A:
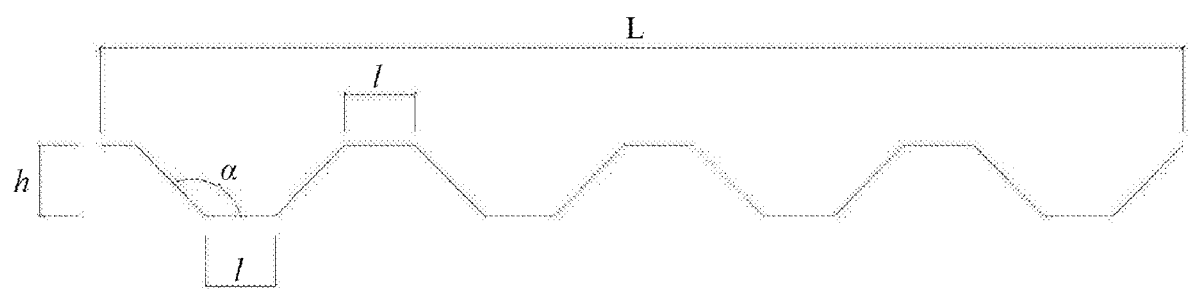
FIG. 3A is a schematic view showing a corrugated type of a single-piece corrugated type anode member according to an embodiment of the present invention.
Figure 3B:
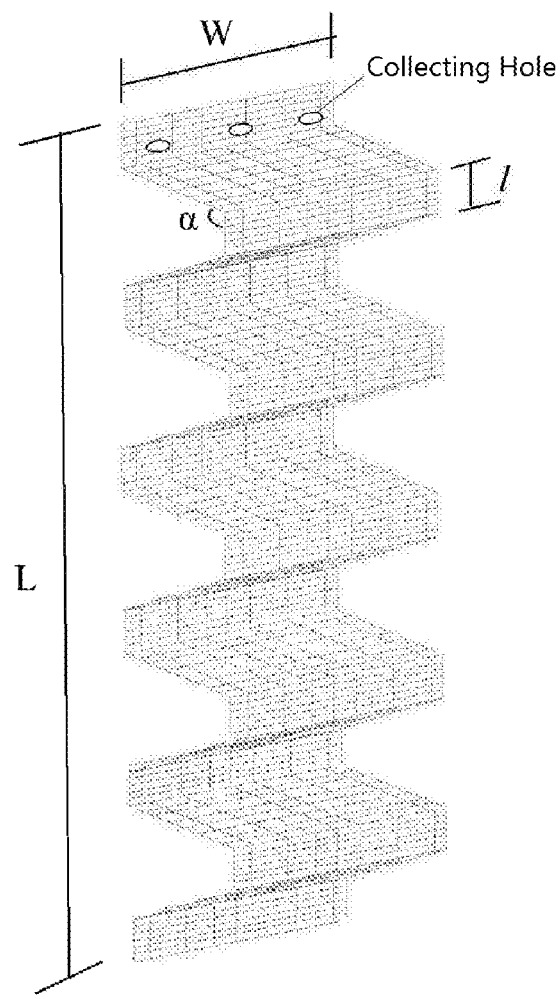
FIG. 3B is a schematic view showing the structure of a single-piece standard corrugated type anode member according to an embodiment of the present invention.

FIG. 3A and FIG. 3B are schematic views showing the structure of a single-piece corrugated type anode member according to an embodiment of the present invention. As shown in FIG. 3A, the corrugated type side length L of the corrugated type anode member in the standard state is 1000 mm, the corrugated type flat side length/is 50 mm, the corrugated type wrinkle angle α is 135°, and the corrugated type height h is 50 mm. As shown in FIG. 3B, the vertical corrugated type side length W is 1000 mm. The anode member material of the embodiment is a 304 stainless steel foil diagonal wire mesh, the single-piece anode member has a thickness of 0.8 mm, the mesh is a rhombic mesh, the aperture is 10 mm×20 mm, and the collecting holes on the current collector have diameters of 15 mm. In the specific implementation process, the above parameters can be adjusted according to actual needs. The adjustment range is: the corrugation type side length L can be adjusted from 300 mm to 2000 mm, preferably from 800 mm to 1500 mm, the corrugated type flat side length/can be adjusted from 10 mm to 100 mm, preferably from 30 mm to 50 mm, the corrugated type wrinkle angle α can be adjusted from 120° to 150°, preferably from 130° to 140°, the corrugated type height h is 10 mm to 100 mm, preferably 30 mm to 70 mm, and the vertical corrugated type side length W is adjustable from 100 mm to 2000 mm, preferably from 800 mm to 1500 mm.

The cathode member can be used in four structural forms: two pieces of corrugated type stainless steel woven meshes clamping stainless steel gas-liquid filter, two corrugated type stainless steel foil diagonal wire meshes clamping stainless steel gas-liquid filter, two corrugated type stainless steel foil punching meshes clamping stainless steel gas-liquid filter, or a stainless steel gas-liquid filter crimped into a roll type cathode member.

The roll type cathode member has a cylindrical shape with a cylindrical diameter of 40 mm to 400 mm, preferably 100 mm to 300 mm. The stainless steel gas-liquid filter has a wire diameter of 0.07 mm to 0.55 mm, more preferably 0.20 mm to 0.25 mm; the mesh aperture is 1×2 mm to 10×20 mm, preferably 2×4 mm to 6×12 mm; the surface of the stainless steel gas-liquid filter is a flat mesh surface or a corrugated mesh surface, and more preferably a corrugated mesh surface. The cathode member material is a chromium-manganese-nickel austenite (200 series) stainless steel mesh or a chromium-nickel austenite (300 series) stainless steel mesh, and more preferably a 304 or 316 stainless steel mesh.

Figure 4A:
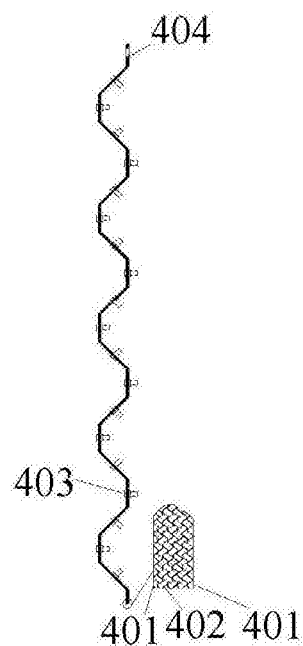
FIG. 4A is a schematic front view showing the structure of a single-piece corrugated type cathode member according to an embodiment of the present invention.
Figure 4B:
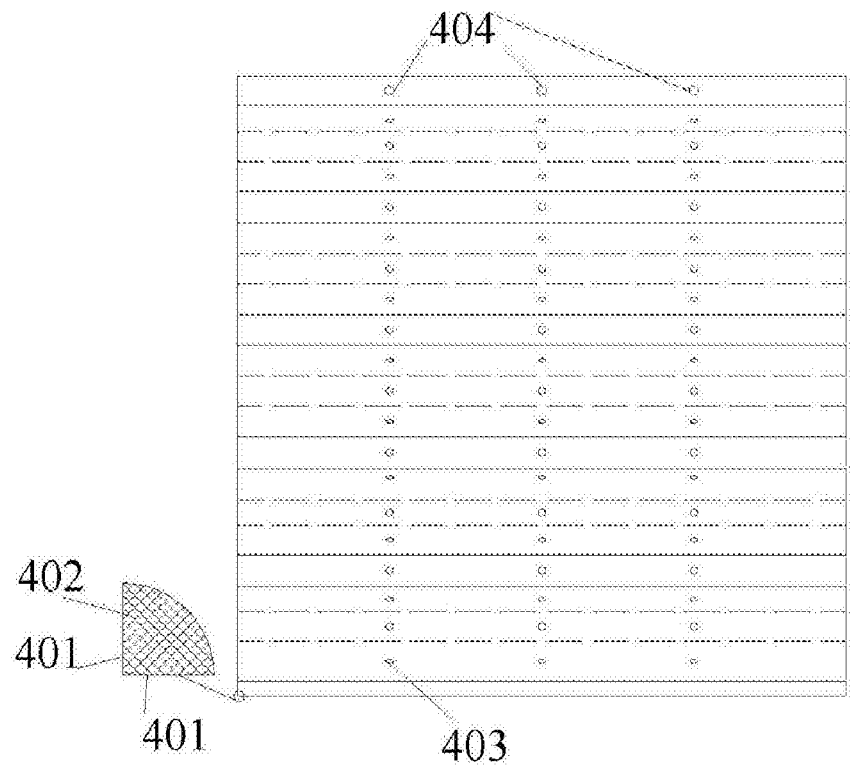
FIG. 4B is a side view showing the structure of a single-piece corrugated type cathode member according to an embodiment of the present invention.

FIGS. 4A and 4B are respectively a schematic front view and a side view showing the structure of a single-piece corrugated type cathode member according to an embodiment of the present invention. As shown in FIG. 4, in the embodiment, the single-piece corrugated type cathode member is composed of two corrugated type stainless steel foil diagonal wire meshes 401 clamping a multi-layer stainless steel gas-liquid filters 402 with a corrugated mesh surface, and the corrugated type stainless steel foil diagonal wire meshes and the stainless steel gas-liquid filters are compounded by a plastic screws 403. Three collecting holes 404 are provided on each cathode assembly. The material characteristics of the corrugated type stainless steel foil diagonal wire mesh are the same as those of the anode member in the embodiment. The corrugated mesh stainless steel gas-liquid filter has a wire diameter of 0.20 mm and a mesh aperture of 2×4 mm, and the peak-to-valley height of the corrugated mesh surface is adjustable from 1 mm to 10 mm. The overall thickness of the compounded single-piece corrugated type cathode member is adjustable from 3 mm to 20 mm, specifically, the thickness of the single-piece corrugated type cathode assembly can be adjusted by changing the number of layers of the clamped stainless steel gas-liquid filter and the peak-to-valley height of the corrugated mesh surface of the gas-liquid filter.

The insulating member may be a porous rubber pad, a porous plastic pad, a porous plexiglass pad or a porous polyvinyl chloride pad. The insulating member has a thickness of 1 mm to 50 mm, preferably 5 mm to 20 mm, and a porous pore size of 1 mm to 50.8 mm, preferably 5.45 mm to 25.4 mm.

The signal transmission assembly includes a current collector, a connector, a reference electrode and a transmission cable. The signal transmission assembly enables the conduction of applied voltage and real-time signal acquisition and transmission of key parameters of the invention (potential, voltage, functional microbial activity, etc.). Wherein, The reference electrode is placed between the cathode member and the anode member, and the reference electrode uses a solid electrode for real-time monitoring of the potential values of the cathode member and the anode member.

The material of the current collector is titanium wire, the diameter of the titanium wire is 0.8 mm to 3 mm, preferably 1.5 mm to 2.5 mm, and the current collector includes a cathode current collector and an anode current collector. The cathode current collector combines all the cathode members in the sewage/wastewater synergistic treatment "acceleration device" in series, and the anode current collector combines all the anode members in the sewage/wastewater synergistic treatment "acceleration device" in series.

The connector includes: a 2-3-4 core three-head connector (code: T234), a 4-core single-head connector (code: S4), a 3-core single-head connector (code: S3) and a 2-core single-head connector (code: S2). The connector is waterproof with a combination of thread rotation, card slot fixing and double apron sealing. The metal of the electrical conduction zone at the head of the connector is made of titanium.

Figure 5:
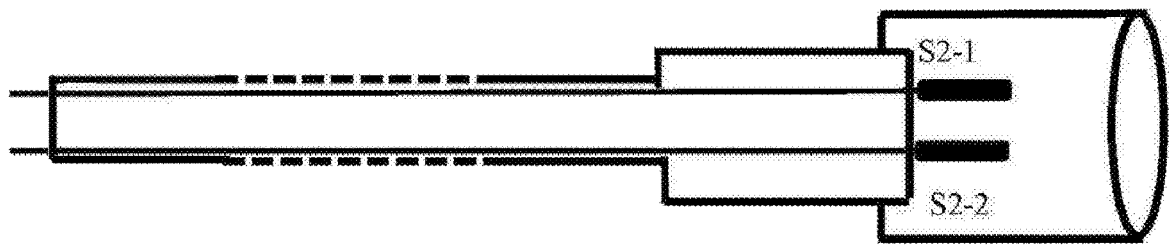
FIG. 5 is a schematic view showing the structure of a 2-core single-head connector of a synergistic treatment acceleration device according to an embodiment of the present invention.

FIG. 5 is a schematic view showing the structure of a 2-core single-head connector (S2 connector) of a sewage (wastewater) synergistic treatment "acceleration device". The connector consists of an outer casing, an embedded male connector head, a transmission cable, and an internal thread sealing sleeve. The outer casing, the embedded male connector head and the transmission cable are integrally formed by injection molding. The outer casing is made of hard PVC, the embedded male connector head is made of titanium wire with a diameter of 2 mm, and the transmission cable has a specification of 2.5 square millimeters to 16 square millimeters, preferably 4 square millimeters to 8 square millimeters. The transmission cable is a 2×4 mm² copper wire cable in the embodiment, and the internal thread sealing sleeve is made of hard PVC. The two copper wires of the S2 connector transmission cable are respectively connected to the positive electrode and negative electrode of the controllable DC power supply. The codes of the male connector head are S2-1 and S2-2, the copper wire connected to S2-1 is connected to the positive electrode of the controllable DC power supply, the copper wire connected to S2-2 is connected to the negative electrode of the controllable DC power supply, S2-1 and S2-2 are connected to the 2-core female connector head of the T234 connector, and the connection method is thread rotation, square card slot fixing, and double apron sealing. The overall waterproof rating after sealing is IP68.

Figure 6:
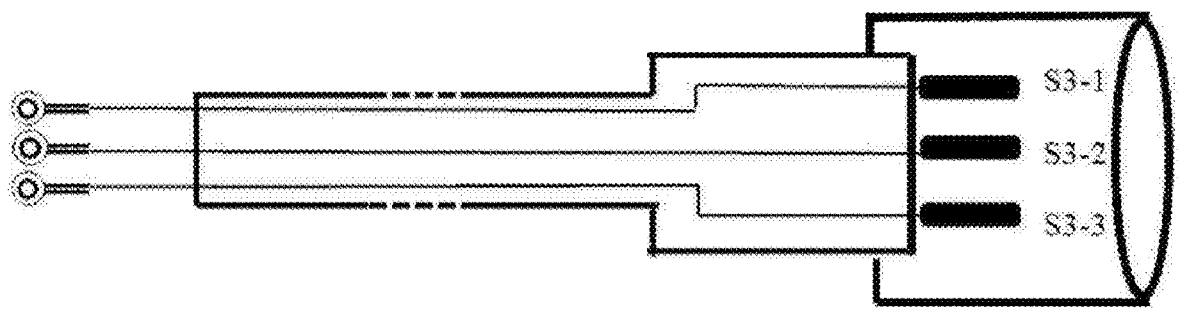
FIG. 6 is a schematic view showing the structure of a 3-core single-head connector of a synergistic treatment acceleration device according to an embodiment of the present invention.

FIG. 6 is a schematic view showing the structure of a 3-core single-head connector (S3 connector) of a sewage (wastewater) synergistic treatment "acceleration device". The components and features of the S3 connector are similar to the S2 connector in FIG. 5. The joint of the 3-core single-head connector and transmission cable is integrally formed by injection molding, except that the embedded male connector head is three titanium wires with diameters of 2 mm, and the transmission cable has a specification of 2.5 square millimeters to 16 square millimeters, preferably 4 square millimeters to 8 square millimeters. In this embodiment, the lead of transmission cable are three titanium wires with diameters of 2 mm, and the titanium wire at the end of the lead is annular and has a diameter of 8 mm. The codes of the three male connector heads are S3-1, S3-2 and S3-3, the transmission lead connected to S3-1 is connected to the collecting hole of the anode member, the transmission lead connected to S3-2 is connected to the output total port of the collecting hole, and the transmission lead connected to S3-3 is connected to the reference electrode. S3-1, S3-2 and S3-3 are connected to the 3-core female connector head of the T234 connector.

Figure 7:
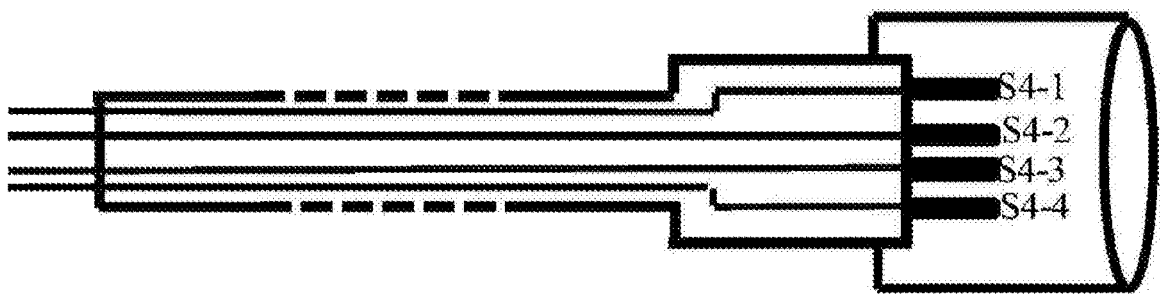
FIG. 7 is a schematic view showing the structure of a 4-core single-head connector of a synergistic treatment acceleration device according to an embodiment of the present invention.

FIG. 7 is a schematic view showing the structure of a 4-core single-head connector (S4 connector) of a sewage (wastewater) synergistic treatment "acceleration device". The components and features of the S4 connector are similar to the S2 connector and S3 connector in FIG. 5 and FIG. 6. The joint of the 4-core single-head connector and transmission cable is integrally formed by injection molding, except that the embedded male connector head is four titanium wires with diameters of 2 mm, the transmission cable has a specification of 2.5 square millimeters to 16 square millimeters, preferably 4 square millimeters to 8 square millimeters, and the transmission cable is a 4×1 mm² copper wire cable in this embodiment. The codes of the four male connector heads are S4-1, S4-2, S4-3 and S4-4. The four copper wires of the S4 connector's transmission cable are connected to the data acquisition device. The S4-1, S4-2, S4-3 and S4-4 connector head are connected to the 4-core connector head of the T234 connector.

Figure 8:
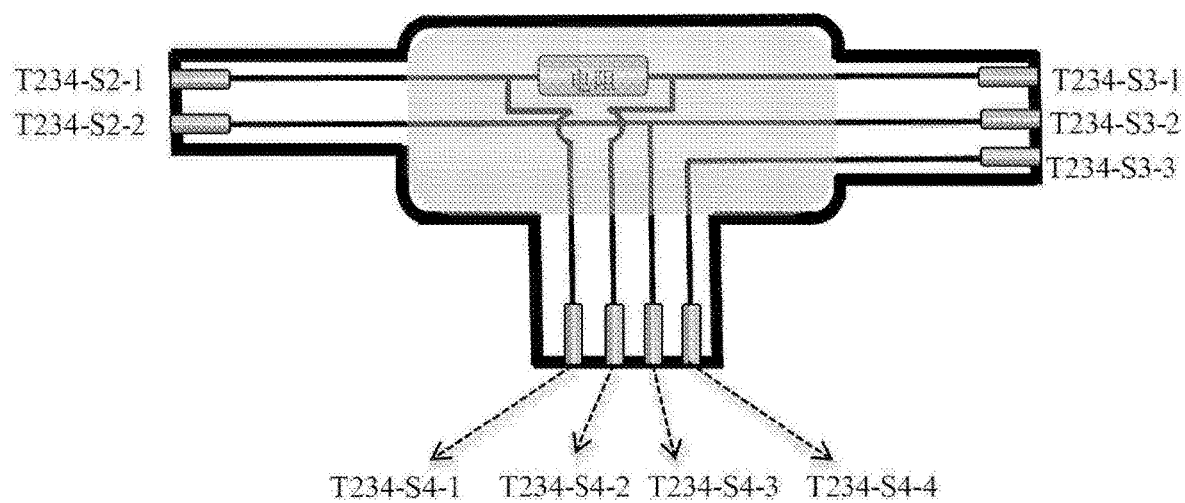
FIG. 8 is a schematic view showing the structure of a 2-3-4 core three-head connector of a synergistic treatment acceleration device according to an embodiment of the present invention.

FIG. 8 is a schematic view showing the structure of a 2-3-4 core three-head connector (T234 connector) of a sewage (wastewater) synergistic treatment "acceleration device". The T234 connector is mainly composed of an outer casing, a female connector head, a built-in lead, and a built-in resistor. The outer casing is integrally formed by injection molding by using the material of hard PVC, and the connector head is externally threaded. The female connector head is a hollow titanium ring with an inner diameter of 2 mm and connected the built-in lead which is a titanium wire with a diameter of 2 mm. The resistance of the built-in resistor is 1 mΩ to 500 mΩ, preferably 1 mΩ to 10 mΩ, which is 5 mΩ in this embodiment. The codes of the two female connector heads of the T234 connector' 2-core connector head are T234-S2-1 and T234-S2-2, respectively connected to the two connector heads of the S2 connector. The codes of the three female connector heads of the T234 connector' 3-core connector head are T234-S3-1, 234-S3-2 and T234-S3-3, respectively connected to the connector heads of the S3 connector. The codes of the four female connector heads of the T234 connector' 4-core connector head are T234-S4-1, 234-S4-2, T234-S4-3 and T234-S4-4, respectively connected to the connector heads of the S4 connector. In the connector: the built-in resistor is connected to T234-S2-1 and T234-S3-1 through the built-in lead, T234-S2-2 and T234-S3-2 are connected by built-in lead, T234-S4-1 is connected to the lead of the built-in resistor near the T234-S2-1 end, the T234-S4-2 is connected to the lead of the built-in resistor near the T234-S3-1 end, T234-S4-3 is connected to the built-in lead which is connected to T234-S2-2, and T234-S3-3 is connected to T234-S4-4.

The monitoring assembly includes: a controllable DC power supply, a data acquisition device and an industrial control system. The main functions of the monitoring assembly are the three main functions of visualization of operation data, voltage intelligent control operation, safety protection and fault diagnosis alarm. Wherein, The output voltage of the controllable DC power supply is 0V to 32V, preferably 0V to 16V. The controllable DC power supply has an output voltage self-calibration function.

The industrial control system includes a data visualization device, an intelligent operation control system and a safety alarm system to realize data visualization, intelligent operation control and safety alarm. The main control parameter of the industrial control system is applied voltage value. The industrial control system adopts closed-loop PID control for the applied voltage value, uploads the measurement result of the data acquisition device to the industrial control computer, and gives the control parameters of the controllable DC power supply on the industrial control computer according to the control algorithm. Wherein, the control algorithm is a control model based on the anode potential, the cathode potential, the material properties of the reaction components (internal resistance), the microbial activity, the conductivity of the treated body, the concentration and nature of the pollutants, and so on. The industrial control system of the invention can also form independent control and unified configuration interaction with other control systems of the reaction system.

The safety alarm system in the industrial control system includes: leakage protection, overload protection gate, and operation abnormal alarm. (1) Leakage protection: at any point of the sewage wastewater synergistic treatment "acceleration device", the total switch is immediately turned off when the leakage occurs. (2) Overload protection gate: when the actual instantaneous load of the electric device of the sewage wastewater synergistic treatment "acceleration device" is higher than 100% of the design load or the long-term (>5 min) actual load is higher than 50% of the design load, the overload protection gate of the electric device is turned on. (3) Operation abnormal alarm: when the data visualization device shows that the anode potential value continues to rise within 5 h and is higher than the preset value of 100 mV or the current value continues to decrease within 5 h and decreases to 80% of the current value before 5 h, the abnormality alarm system issues a yellow alarm; when the data visualization device shows that the anode potential value continues to rise within 5 h and is higher than the preset value of 200 mV or the current value continues to decrease within 5 h and decreases to 50% of the current value before 5 h, the abnormality alarm system issues a red alarm.

Figure 9A:
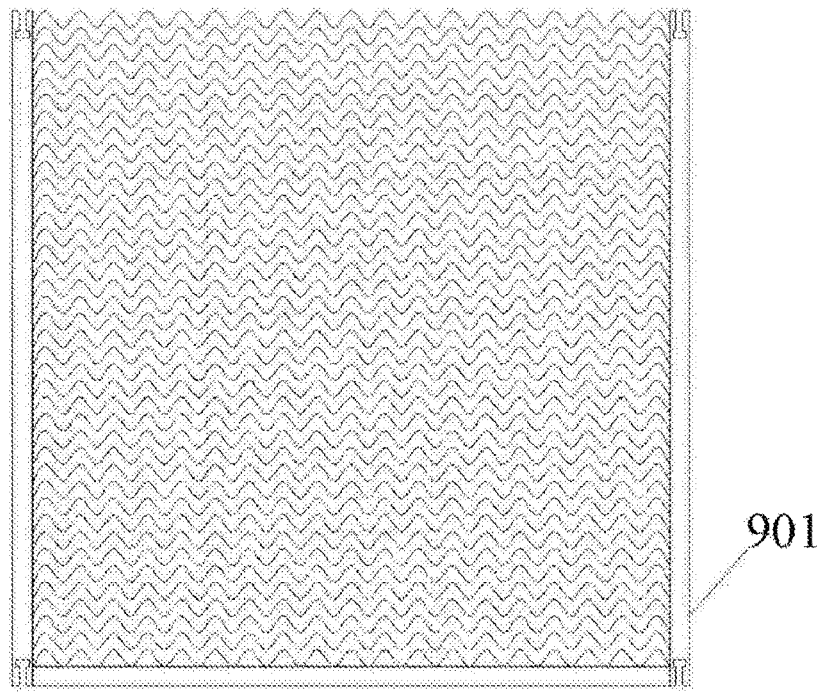
FIG. 9A is a schematic front view showing the structure of a bottom frame of a housing carrying assembly of the synergistic treatment acceleration device according to an embodiment of the present invention.
Figure 9B:
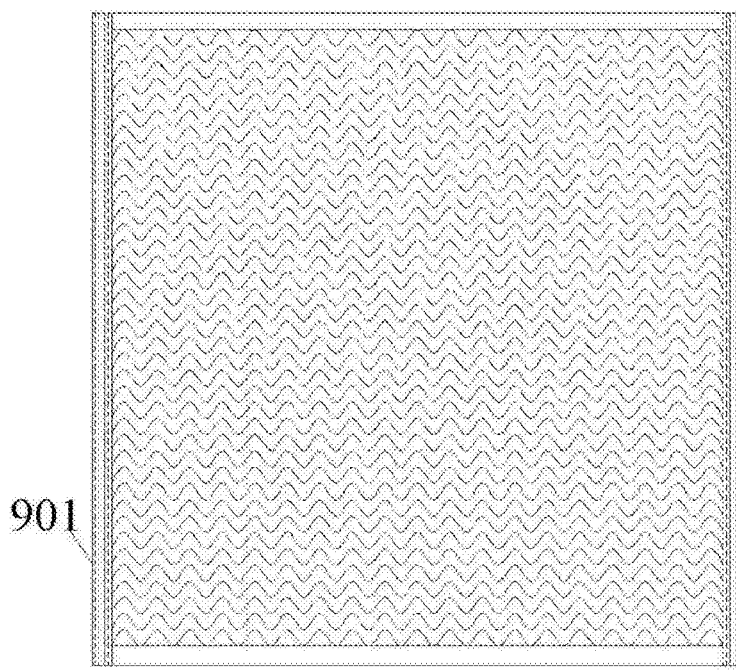
FIG. 9B is a schematic top view showing the structure of a bottom frame of a housing carrying assembly of the synergistic treatment acceleration device according to an embodiment of the present invention.
Figure 9C:
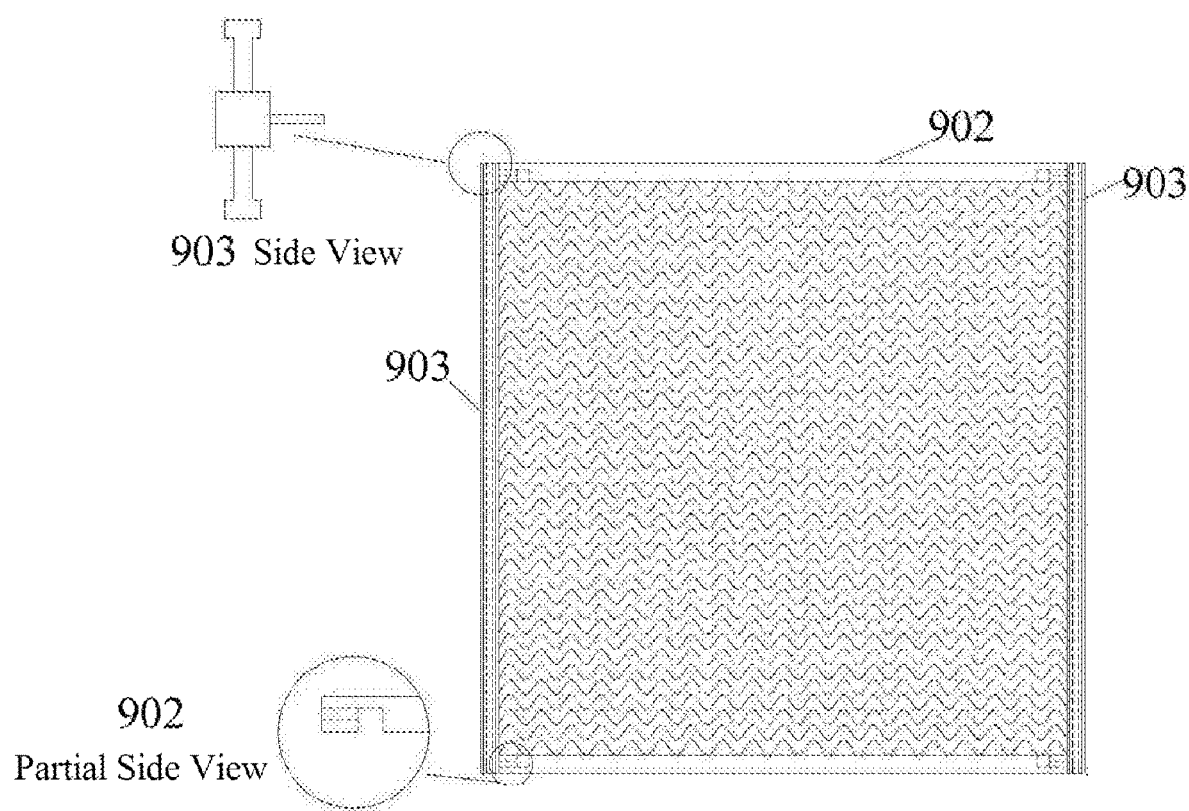
FIG. 9C is a schematic top view showing the structure of a top frame of a housing carrying assembly of the synergistic treatment acceleration device according to an embodiment of the present invention.

FIG. 9 provides a schematic view showing the structure of a housing carrying assembly of the synergistic treatment acceleration device. The housing carrying assembly is mainly used to carry the reaction assembly and the signal transmission assembly, and designed to be detachable to facilitate series-parallel operation of multiple sets of acceleration devices. The housing carrying assembly is composed of a bottom frame 901, a top frame main body 902, and two combined inserts 903. The material of the housing carrying assembly is made of engineering plastics, preferably Teflon and ABS plastic. The material used in the housing carrying assembly in this embodiment is ABS plastic. The housing carrying assembly can be used in four different configurations: ① multi-section microporous structure, ② louvered structure, ③ porous structure, ④ strip-shaped structure. The housing carrying assembly may have a corrugated flow guiding channel or a louvered flow guiding channel or a porous flow guiding channel. In this embodiment, the five water passing surfaces of the bottom frame have corrugated flow guiding channels, and the upper and lower ends of the four bearing strips in the vertical direction of the bottom frame are recessed by a "T" shaped groove. The water passing surface of the top frame main body has a corrugated flow guiding channel, and the two bearing strips of the top frame main body and the combined inserts are connected by eccentric screws, and the upper and lower ends of the combined inserts are respectively provided with a convex "T" type skeleton. The length×width×height of the housing carrying assembly is 0.3 m×0.3 m×0.3 m to 2 m×2 m×2 m, preferably 0.8 m×0.8 m×0.8 m to 1.2 m×1.2 m×1.2 m. The housing carrying assembly is a cuboid (cube) in which the surrounding surface and the bottom surface are integrally molded and the upper surface is removable.

Figure 10:
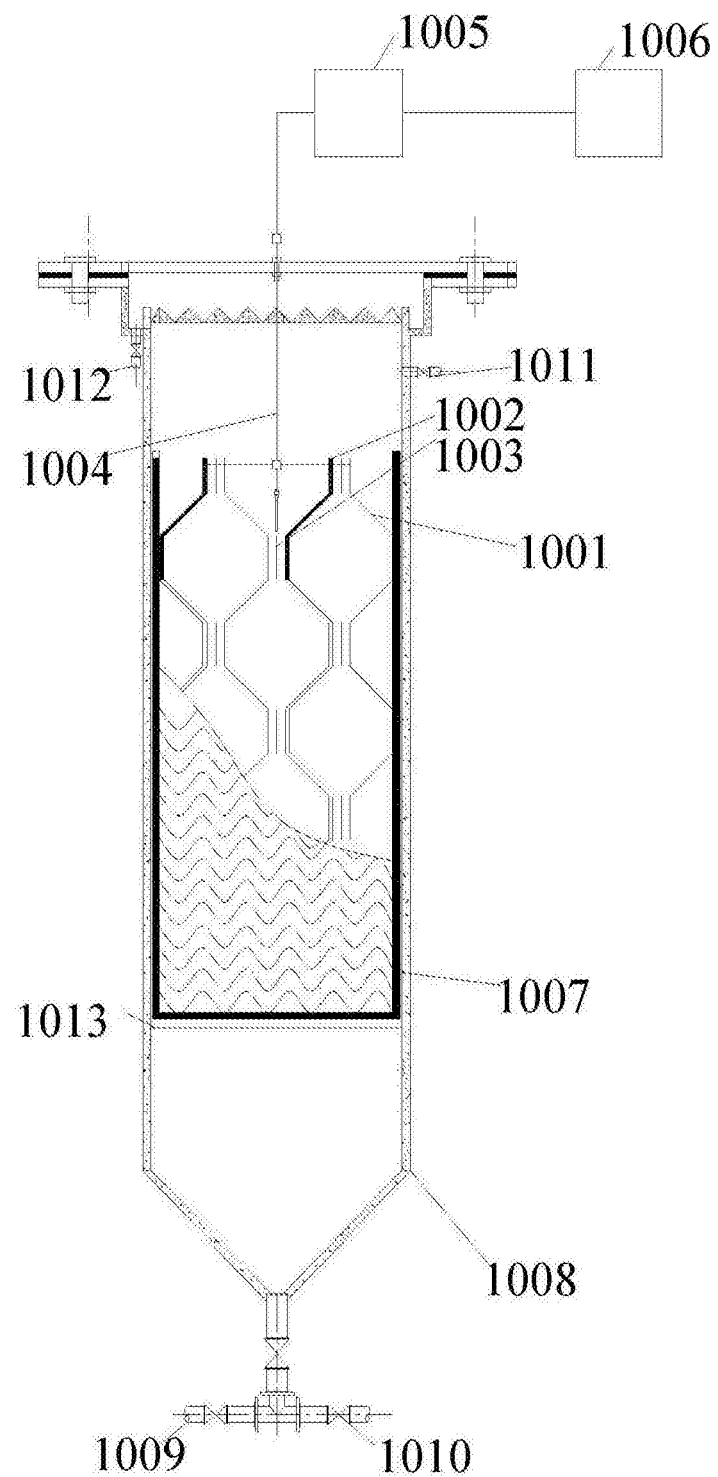
FIG. 10 is a schematic view showing the structure of an upflow anaerobic reactor with a built-in "honeycomb" synergistic treatment acceleration device according to an embodiment of the present invention.

In the embodiment of the present invention, FIG. 10 provides a schematic view showing the structure of an upflow anaerobic reactor with a built-in "honeycomb" synergistic treatment "acceleration device". The "honeycomb" synergistic treatment "acceleration device" used in the embodiment mainly consists of two sets of corrugated type anode members 1001, two sets of corrugated type cathode members 1002, an insulating member 1003, a signal transmission assembly 1004, a monitoring assembly 1005, a controllable DC power supply 1006, and a housing carrying assembly 1007.

The upflow anaerobic reactor consists of a reactor body 1008, a water inlet valve 1009, a mud discharge valve 1010, a sampling valve 1011, a water outlet valve 1012, and an "acceleration device" bracket 1013. The reactor body 1008 includes the "honeycomb" synergistic treatment "acceleration device" described above and is placed on the "acceleration device" bracket 1013.

The specific parameters of the synergistic treatment "acceleration device" used in this embodiment are: the material of the corrugated type anode member 1001 using stainless steel foil diagonal wire mesh, and the specifications of which including: mesh thickness of 0.8 mm, mesh aperture of 15 mm×20 mm, corrugated type side length (L) of 700 mm, vertical corrugated type side length (W) of 250 mm, corrugated type wrinkle angle ($\alpha$) of 135°, flat side length (l) of 30 mm, and corrugated type height (h) of 30 mm. The corrugated type outer meshes of the corrugated type cathode member 1002 have the same material and specifications to those of the anode member, and clamp 8 layers of 304 stainless steel gas-liquid filters with a corrugated mesh surface, of which the wire diameter is 0.20 mm and the mesh aperture is 2×4 mm. The insulating member 1003 is a porous plastic pad. The housing carrying assembly 1007 is a corrugated flow guiding type engineering plastic frame. The signal transmission component 1004 is composed of a solid silver-silver chloride electrode, a transmission cable, a 3-core single-head connector, a 2-3-4 core three-head connector, a 2-core single-head connector, and a 4-core single-head connector. The monitoring assembly 1005 is composed of a controllable DC power supply 1006, a data acquisition device, and an industrial control system.

During the implementation, the bottom of the upflow anaerobic reactor is inoculated with anaerobic sludge (the sludge concentration of the overall reactor was controlled to about 4000 mg/L). The synergistic treatment "acceleration device" is placed entirely in the water phase of the reactor, and the in-situ startup mode is adopted. The potential value of the anode electrode during the whole startup period is lower than +200 mV. After successful domestication, the value of the applied voltage between the anode electrode and the anode electrode of the "acceleration device" is controlled around 0.7V. The influent of the upflow anaerobic reactor with built-in "honeycomb" synergistic treatment "acceleration device" has a glucose concentration of 281 mg/L and an azo dye (Orange II) concentration of 100 mg/L.

In order to better illustrate the performance of the embodiment, a comparative example is provided in this embodiment. The difference between the comparative example and the embodiment in FIG. 10 is that there is no built-in synergistic treatment "acceleration device" in the upflow anaerobic reactor in the comparative example. The designed shape parameters and operation mode of the upflow anaerobic reactor in the comparative example are the same as those in the embodiment.

Figure 11:
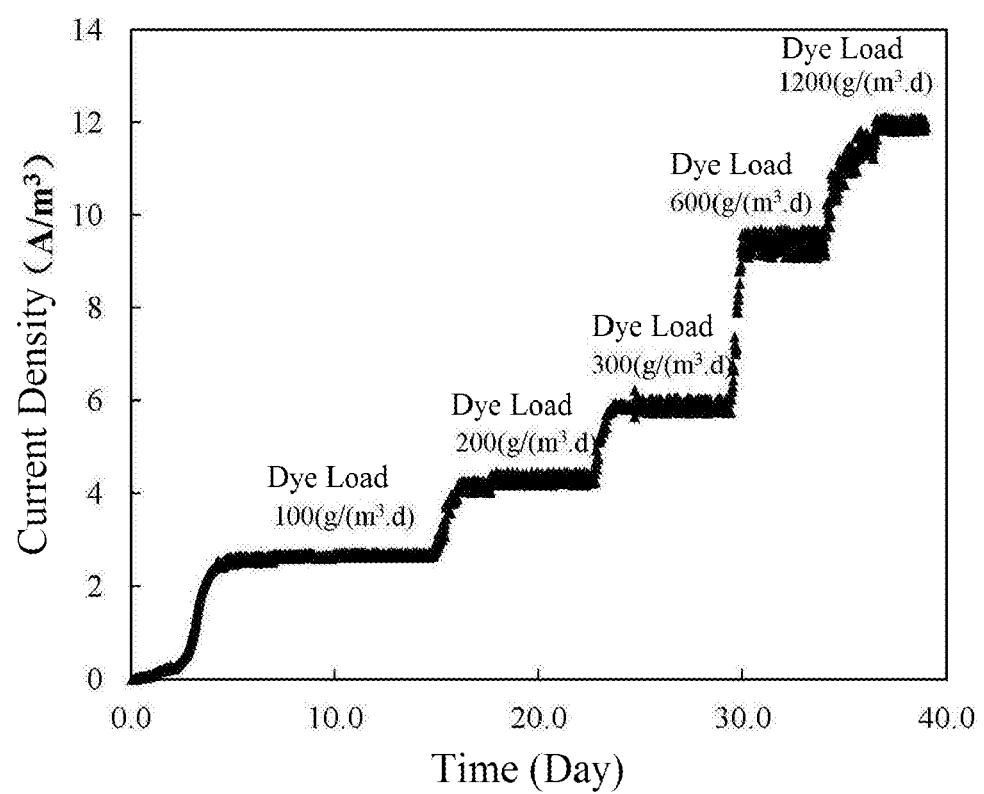
FIG. 11 shows the current density of the microbial tissue generated over time in a "honeycomb" synergistic treatment acceleration device according to an embodiment of the present invention.

FIG. 11 provides the current density of the microbial tissue generated over time in the upflow anaerobic reactor with a built-in "honeycomb" synergistic treatment "acceleration device" in the embodiment of FIG. 10. FIG. 11 shows that the synergistic treatment "acceleration device" is domesticated for about 5 days and achieved a stable current density of 2.5 A/m$^3$. The reaction system is continuously operated for about 40 days under the condition of 0.7 V applied voltage value. During the implementation, the current density increases with the increase of the load of the pollutant (Orange II).

Figure 12:
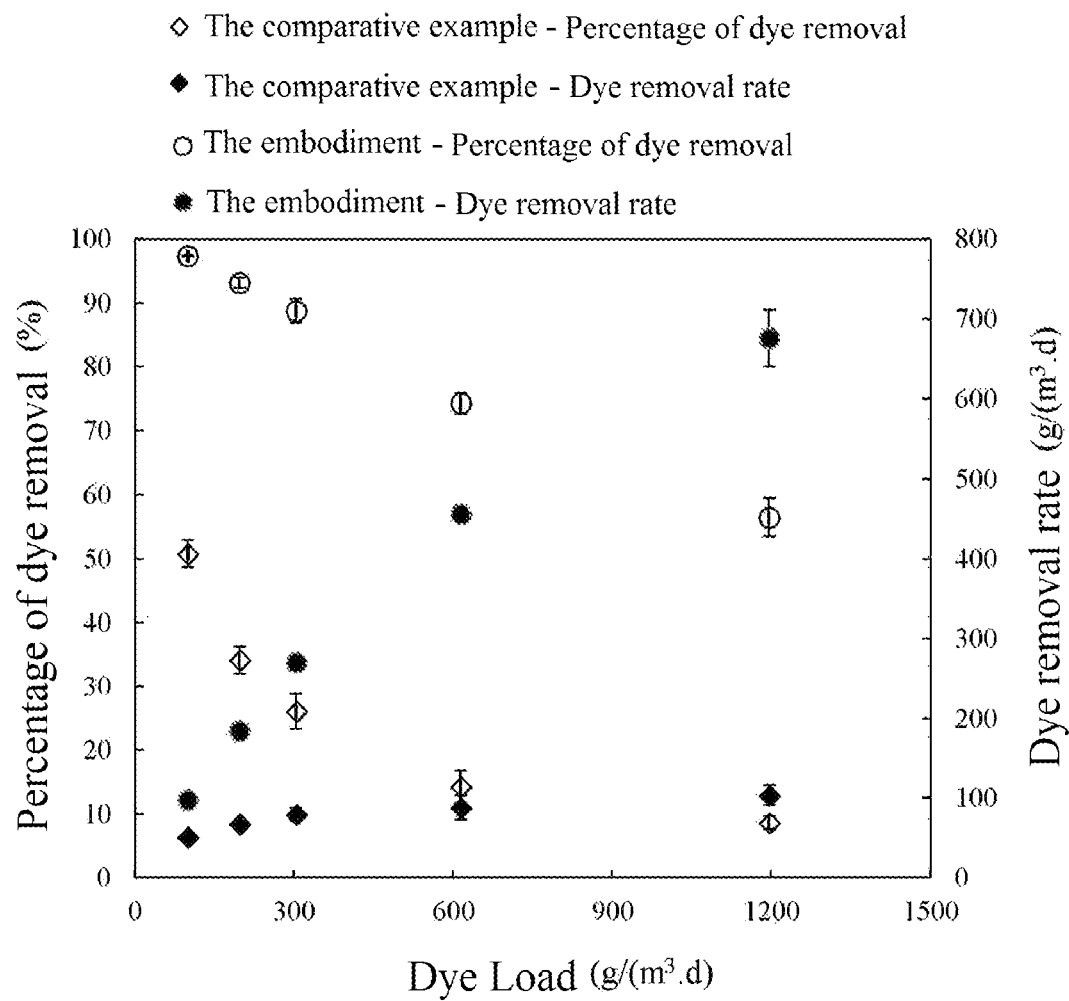
FIG. 12 shows the decolorization efficiency of a "honeycomb" synergistic treatment acceleration device for azo dye-containing wastewater according to an embodiment of the present invention.

FIG. 12 provides the decolorization efficiency of the azo dye in the upflow anaerobic reactor with a built-in "honeycomb" synergistic treatment "acceleration device" in the embodiment of FIG. 10. FIG. 12 shows that when the influent dye load of the control system is 100 g·m$^{-3}$·d$^{-1}$, 200 g·m$^{-3}$·d$^{-1}$, 300 g·m$^{-3}$·d$^{-1}$, 600 g·m$^{-3}$·d$^{-1}$ and 1200 g·m$^{-3}$·d$^{-1}$, the removal rates of the Orange II of the embodiment were 97.4±0.2 g·m$^{-3}$·d$^{-1}$, 184.0±1.6 g·m$^{-3}$·d$^{-1}$, 269.4±5.7 g·m$^{-3}$·d$^{-1}$, 456.3±10.0 g·m$^{-3}$·d$^{1}$ and 675.6±35.8 g·m$^{-3}$·d$^{-1}$, and the removal rates of the orange II of the comparative example were 50.7±2.2 g·m$^{-3}$·d$^{-1}$, 67.4±4.2 g·m$^{-3}$·d$^{-1}$, 79.3±8.3 g·m$^{-3}$·d$^{-1}$, 87.9±15.1 g·m$^{-3}$·d$^{-1}$ and 103.5±12.2 g·m$^{-3}$·d$^{-1}$. The above results show that the embodiment can greatly improve the decolorization rate of Orange II wastewater, especially under high dye loading conditions (greater than 1 kg·m$^{-3}$·d$^{-1}$), and the decolorization rate of azo dye is increased by more than 5 times.

Figure 13A:
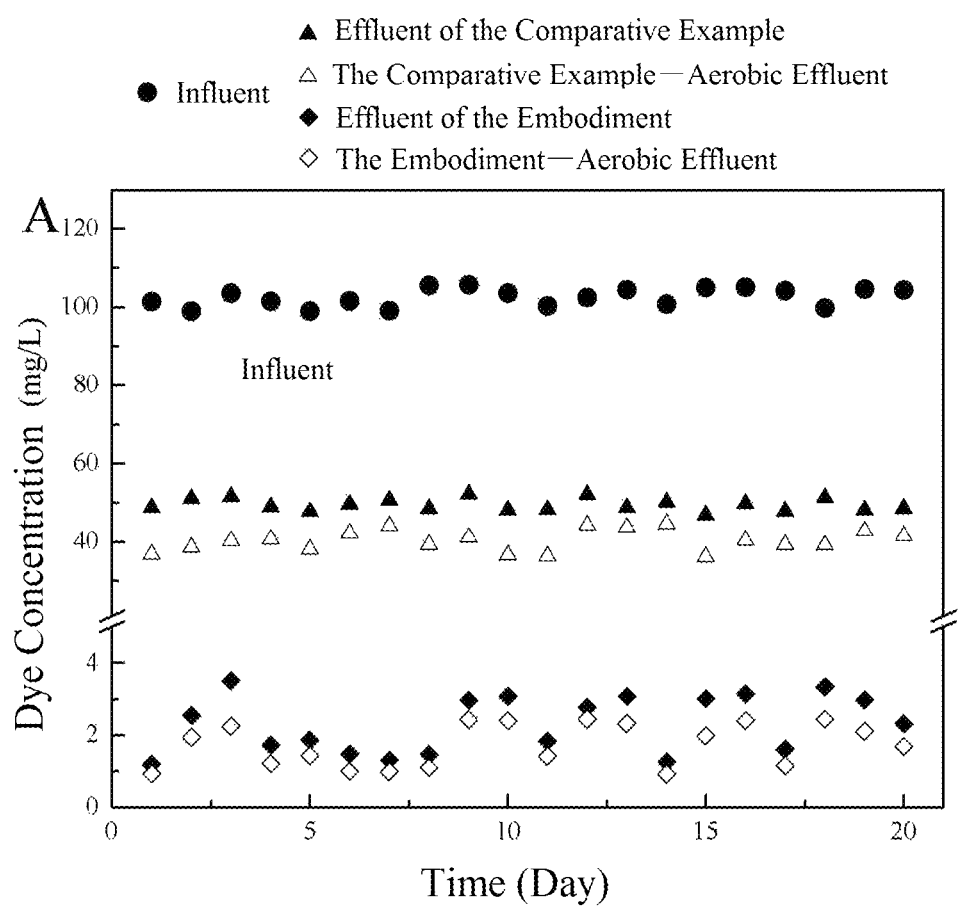
FIG. 13A shows the treatment efficiency (concentration vs time) of the effluent through an aerobic system after conditioning of the azo dye wastewater by a "honeycomb" synergistic treatment acceleration device according to an embodiment of the present invention.
Figure 13B:
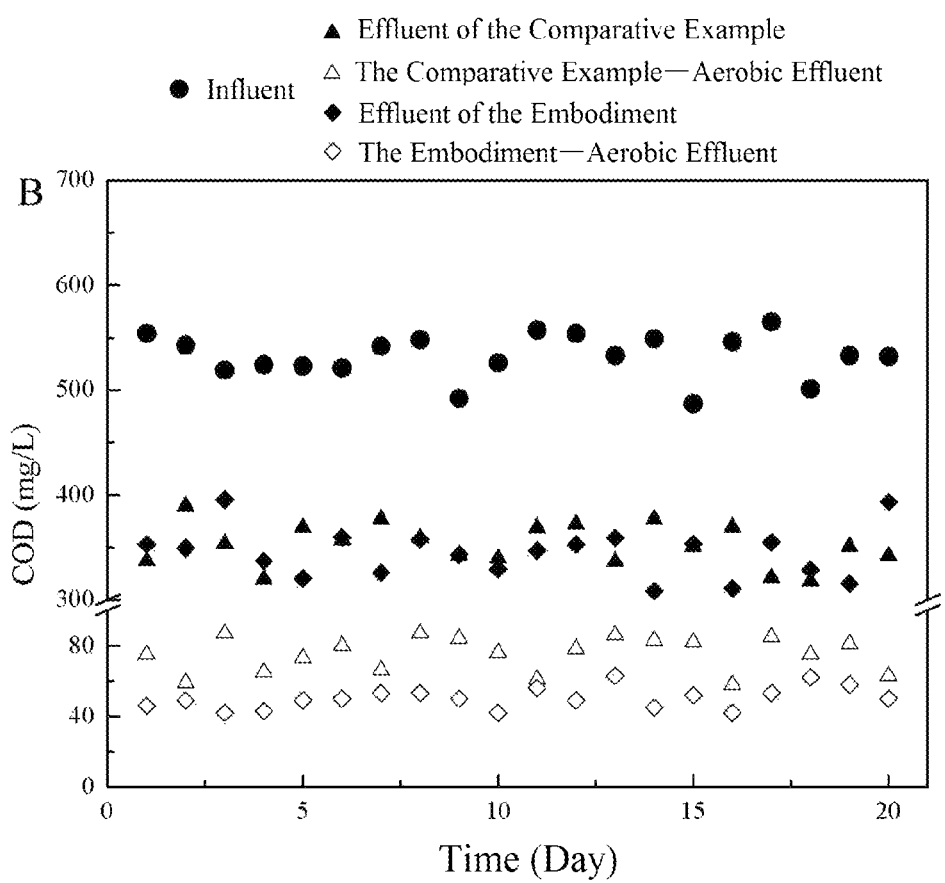
FIG. 13B shows the treatment efficiency (COD vs time) of the effluent through an aerobic system after conditioning of the azo dye wastewater by a "honeycomb" synergistic treatment acceleration device according to an embodiment of the present invention.

FIG. 13 provides the treatment efficiency of the effluent through an aerobic system after conditioning of the azo dye wastewater by the upflow anaerobic reactor with a built-in "honeycomb" synergistic treatment "acceleration device" in the embodiment of FIG. 10. The comparative example provided in FIG. 13 is no different from the comparative example in FIG. 12. The aerobic system described in the embodiment depicted in FIG. 13 and the comparative example is a circulating activated sludge process. FIG. 13 shows that the COD value of the aerobic system effluent in the embodiment is relatively stable and lower than the COD value of the aerobic system in the comparative example. When the influent dye load is 100 g·m$^{-3}$·d$^{-1}$, the Orange II concentration of the aerobic system effluent in the embodiment is less than 1 mg/L, which is significantly lower than the Orange II concentration of the aerobic system effluent in the comparative example. The above results show that the embodiment has excellent water conditioning performance for azo dye wastewater, and the effluent can be better degraded in the subsequent aerobic system.

Figure 14:
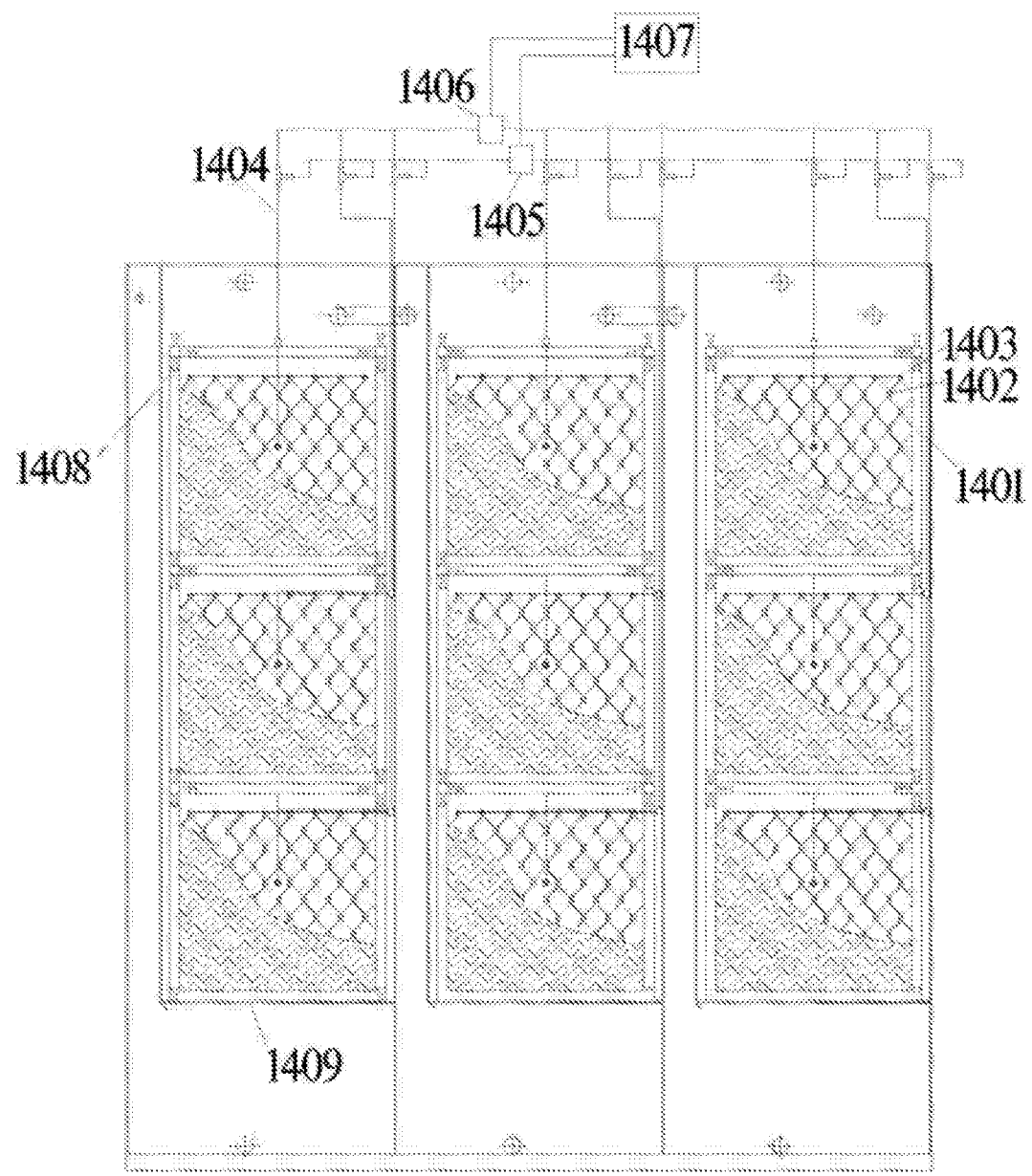
FIG. 14 is a schematic view of a parallel structure of nine sets of acceleration devices according to an embodiment of the present invention.

Another embodiment of the upflow anaerobic reactor with a built-in "honeycomb" synergistic treatment "acceleration device" of the present invention is described in conjunction with FIG. 14. FIG. 14 provides a multiple sets of "acceleration device" units operating in parallel. A 3-cell anaerobic baffled reactor is used as the reactor body, and 9 sets of "honeycomb" synergistic treatment "acceleration devices" are built in parallel in the anaerobic baffled reactor. Each set of synergistic treatment "acceleration device" has an independent reaction assembly, a signal transmission assembly 1404 and a housing carrying assembly 1408. In the implementation process, 9 sets of "acceleration device" share a set of monitoring system, which includes a data acquisition device 1405, a controllable DC power supply 1406 and an industrial control computer 1407. The controllable DC power supply in this embodiment is a multi-channel DC power supply, and the output voltage of each passage can be separately controlled. The voltage value between the cathode member and member of each "acceleration device" can be separately controlled by the shared monitoring system during implementation. During the implementation, the "T" type concave and convex groove design of the housing carrying assembly realizes the fixing and stacking of the upper and lower "acceleration devices". Each cell has three "honeycomb" synergistic treatment "acceleration devices" built in the up and down direction.

The reaction assembly of one set of "acceleration device" in this embodiment has an outer dimension of 650 mm×650 mm×650 mm, which is composed of 5 sets of corrugated type anode members, 5 sets of corrugated type cathode members and 9 sets of insulating members. The specific parameters of the anode member are: the material of the corrugated type anode member 1401 using 304 stainless steel foil diagonal wire mesh, and the specifications of the stainless steel foil diagonal wire mesh including: mesh thickness of 0.8 mm, mesh aperture of 15 mm×20 mm, corrugated type side length (L) of 650 mm, vertical corrugated type side length (W) of 650 mm, corrugated type wrinkle angle (α) of 135°, flat side length (l) of 50 mm, and corrugated type height (h) of 50 mm. The corrugated type outer meshes of the corrugated type cathode member 1402 have the same material and specifications to those of the anode member, and clamp 8 layers of 304 stainless steel gas-liquid filters with a corrugated mesh surface, of which the wire diameter is 0.20 mm and the mesh aperture is 2×4 mm. The insulating member 1403 is a porous plastic pad. Each set of corrugated type anode members and corrugated type cathode members form "honeycomb" by staggered arrangement, and the anode member and the cathode member are completely separated by an insulating member. The housing carrying assembly 1408 is a corrugated flow guiding type engineering plastic frame with an outer dimension of 700 mm×700 mm×700 mm. The signal transmission assembly 1404 is composed of a solid silver-silver chloride electrode, a transmission cable, a 3-core single-head connector, a 2-3-4 core three-head connector, a 2-core single-head connector, and a 4-core single-head connector.

During the implementation, the bottom of each cell of the anaerobic baffled reactor is inoculated with anaerobic sludge (the sludge concentration of the overall reactor is controlled to about 4000 mg/L). The synergistic treatment "acceleration devices" of each cell are placed entirely in the water phase of the reactor, and are arranged and supported by the acceleration device bracket 1409. The in-situ startup mode is adopted. The potential value of the anode electrode during the whole startup period is lower than +200 mV. After successful domestication, the value of the applied voltage between the anode electrode and the anode electrode of the "acceleration device" is controlled around 0.7V. The influent is a low-concentration industrial source-living source mixed wastewater.

In this embodiment, the performance of the acceleration device in the embodiment is better illustrated by a comparative example. The comparative example has the same parameters as the anaerobic baffled reactor used in the embodiment, but there is no built-in synergistic treatment "acceleration device" in the comparative example. During the operation, the bottom of each cell in the comparative example is inoculated with anaerobic sludge (the sludge concentration of the overall reactor is controlled to 4000 mg/L), and the influent is consistent with this embodiment.

Figure 15A:
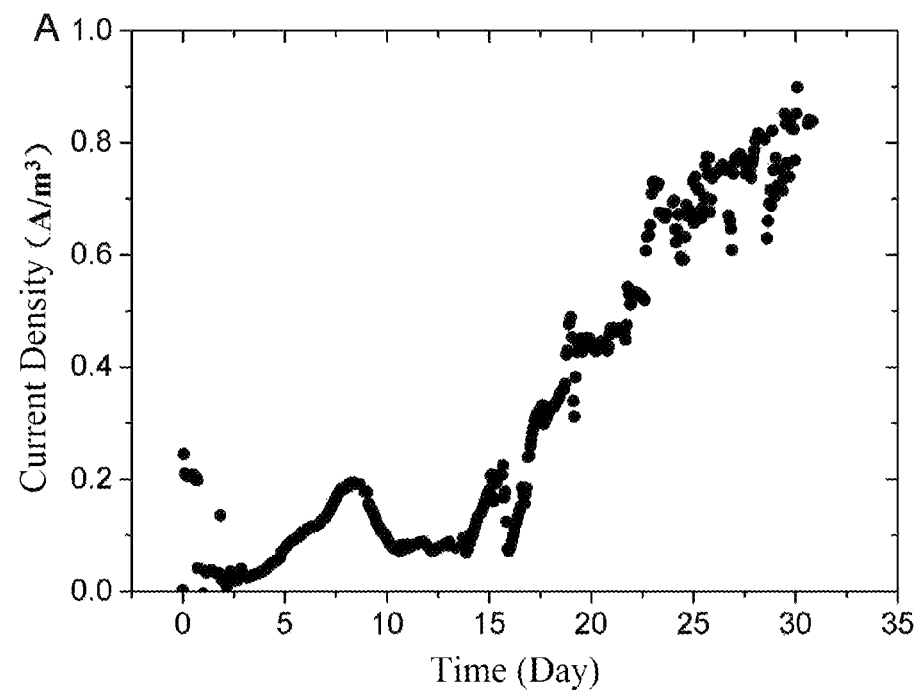
FIG. 15A shows the current density of the microbial tissue generated over time when nine sets of acceleration devices are operated in parallel according to an embodiment of the present invention.
Figure 15B:
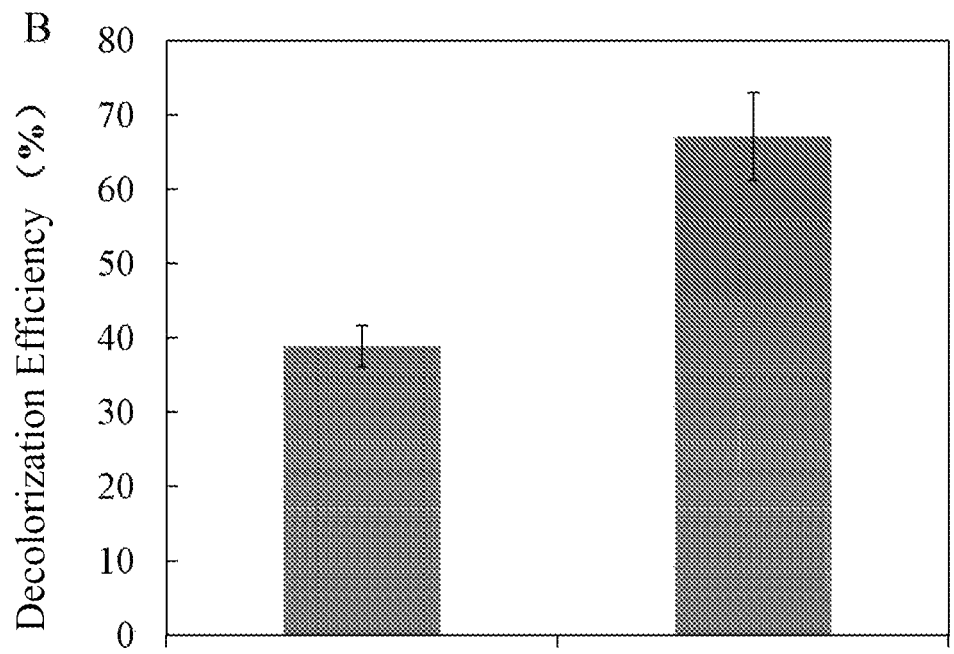
FIG. 15B is a graph comparing the removal rate of chromaticity of wastewater according to an embodiment of the present invention and a comparative example.

FIG. 15 shows the current density of the microbial tissue generated over time by the synergistic treatment acceleration device in the present embodiment, and the current density takes into account the current and volume generated by the nine sets of synergistic treatment acceleration devices. After 15 days of continuous operation, the current density increases sharply, and the current density reaches 0.85 A/m$^3$ when it is continuously operated for 30 days. Compared with the comparative example, the removal rate of the chromaticity of the wastewater is increased by 30% in this embodiment.

The sewage/wastewater synergistic treatment acceleration device can be built into the biochemical reaction system in a single set, or multiple sets of sewage/wastewater synergistic treatment acceleration device can be built in the biochemical reaction system to realize the serial/parallel operation. The sewage/wastewater synergistic treatment acceleration device can be used as a bioelectrochemical module alone or in combination with existing anaerobic biological treatment processes or anoxic biological treatment processes.

During the operation of the sewage/wastewater synergistic treatment acceleration device, the anode member and the cathode member are all activated by in-situ enrichment, control the weak voltage value existing between the most unfavorable point of the cathode electrode and the most unfavorable point of the anode electrode of the sewage/wastewater synergistic treatment acceleration device, and constantly maintain the anode potential below 200 mV. At the start-up phase of the device, the enrichment state of the anode biofilm is judged by the removal efficiency of the pollutants or the current characteristics of the reactor or the scanning electron microscope of the anode electrode and cathode electrode. The intelligent control of voltage of the sewage/wastewater synergistic treatment acceleration device ensures the stable and reliable operation of the system.

The sewage/wastewater synergistic treatment acceleration device can reduce the biological toxicity of medium and low concentration industrial wastewater, industrial park mixed wastewater, micro-polluted wastewater and refractory organic pollutants in contaminated sediment, and destroy the structural complexity of refractory organic pollutants, accelerate the decomposition of refractory organics, and it also has the characteristics of high efficiency, catalytic acceleration, enhanced degradation of trace difficult pollutants and so on. The sewage/wastewater synergistic treatment "acceleration device" can also be applied to water quality and ecological restoration in micro-polluted natural water bodies.

The sewage/wastewater synergistic treatment acceleration device can strengthen the colonization/proliferation of functional microorganisms in the treatment system, increase the number of functional microorganisms in the reaction system, and optimize the microbial community structure. It can be applied to the ecological restoration of contaminated sediment and the reconstruction of functional microbial community structure.

The objects, the technical solutions and the beneficial effects of the present invention are described in detail by the above embodiments. It should be understood that the above is only the specific embodiments of the present invention, and is not intended to limit the present invention. Any modifications, equivalent substitutions, improvements, etc., made within the spirit and principles of the present invention are intended to be included within the scope of the present invention.

What is claimed is:

1. A reaction assembly comprising a plurality of anode members and cathode members, wherein, an anode member is of a corrugated type, and a cathode member is of a roll type; the anode member and the cathode member forms a porous passage; the anode member and the cathode member are isolated by an insulating member;
    the anode members are staggered arranged to form "honeycomb" passages, the cathode members are filled in the "honeycomb" passages in an axial direction of the corrugated type; and
    the insulating member covers the cathode member.

2. The reaction assembly according to claim 1, wherein, said anode member is selected from a group consisting of a stainless steel woven mesh, a stainless steel foil diagonal wire mesh and a stainless steel foil punching mesh.

3. The reaction assembly according to claim 1, wherein, said cathode member is a stainless steel gas-liquid filter crimped into a roll type.

4. The reaction assembly according to claim 1, wherein, said anode members are held together by a combination screw.

5. A sewage/wastewater synergistic treatment acceleration device comprising the reaction assembly according to claim 1, a signal transmission assembly and a monitoring assembly;
    the reaction assembly is capable of performing proliferation of microorganisms;
    said signal transmission assembly is used to conduct an applied voltage to the reaction assembly and to collect data from the reaction assembly in real time and to transmit the data to said monitoring assembly; and
    said monitoring assembly converts the data into intelligent control operation of applied voltage that determines to alert diagnosis alarm.

6. The sewage/wastewater synergistic treatment acceleration device according to claim 5, wherein, further comprises a housing carrying assembly, and said housing carrying assembly is used for carrying the reaction assembly and the signal transmission assembly.

7. The sewage/wastewater synergistic treatment acceleration device according to claim 6, wherein, said housing carrying assembly has a corrugated flow guiding channel or a louvered flow guiding channel or a porous flow guiding channel.

8. The sewage/wastewater synergistic treatment acceleration device according to claim 5, wherein, said signal transmission assembly includes: a current collector, a connector, a reference electrode and a transmission cable;
    said current collector includes a cathode current collector and an anode current collector, the cathode current collector is used for series current collection of the cathode members, and said anode current collector is used for series collection of the anode members; and
    said connector connects the reference electrode, the current collector and the monitoring assembly through a transmission cable.

9. The sewage/wastewater synergistic treatment acceleration device according to claim 8, wherein,
    said connector includes a 2-3-4 core three-head connector, a 4-core single-head connector, a 3-core single-head connector and a 2-core single-head connector;
    an input end of said 2-core single-head connector is connected to a power supply of the monitoring assembly, and an output end is connected to the 2-core head of the 2-3-4 core three-head connector;
    an input end of said 3-core single-head connector is connected to the anode current collector, the cathode current collector and the reference electrode, and an output end is connected to the 3-core head of the 2-3-4 core three-head connector; and
    an input end of said 4-core single-head connector is connected to the 4-core head of the 2-3-4 core three-head connector, and an output end is connected to the monitoring assembly.

10. The sewage/wastewater synergistic treatment acceleration device according to claim 5, wherein, said monitoring assembly includes a controllable DC power supply, a data acquisition device and an industrial control system.

11. An upflow anaerobic reactor comprising one or multiple sets of sewage/wastewater synergistic treatment acceleration devices according to claim 5.

12. The upflow anaerobic reactor according to claim 11, wherein, said multiple sets of sewage/wastewater synergistic treatment acceleration device units operate in series or in parallel.

* * * * *